TAMPER PROOF INFORMATION BEARING CARD

Filed Sept. 29, 1967

INVENTOR:
LAWRENCE A. CONNER,
BY Robert J. McDonnell
ATTORNEY 3,566,521
TAMPER PROOF INFORMATION BEARING CARD

Lawrence A. Conner, 137 Skyline Drive, Glen Mills, Pa. 19342

Filed Sept. 29, 1967, Ser. No. 671,867
Int. Cl. G09f 3/02
U.S. Cl. 40—2.2 4 Claims

ABSTRACT OF THE DISCLOSURE

This invention relates to the protection against unwanted or unauthorized alterations of information by the utilization of photography. Particularly, this invention utilizes a photographic transparency in a heat-and-pressure laminated structure, which transparency is designed to become defaced if the lamination is opened in any way.

This invention relates to a security device for the protection of information. More specifically, this invention relates to a security device and a process of preparing the same for protecting information from unwanted alteration, as the information is distributed or disseminated. The invention has particular applicability to identification cards, which preferably should be secure from unwanted or unauthorized alteration.

An object of this invention is to provide a novel security device which will readily enable detection of attempted unwanted or unauthorized alterations to the information contained therein.

An additional object of this ivention is to provide a novel process for protecting information from unwanted or unauthorized alterations.

A further object of this invention is to provide a novel process for protecting information bearing surfaces by the use of photography.

A still further object of this invention is to provide a quick, commercially adaptable process utilizing photographic transparencies, which provides protection to information bearing surfaces from unwanted or unauthorized alterations.

Another object of this invention is to provide a security device which, because of its transparent qualities, enables the use of the security device with a wide variety of daylight process films and duplicating systems.

Another object of this invention is to provide a novel security device which utilizes photographic transparencies of dissimilar material than the laminating materials so that the photographic transparency is not laminated to the laminating materials in the laminar structure.

Other objects of the invention will in part be obvious and will in part appear from the following detailed description thereof.

The attached drawing illustrates the preferred embodiment of the invention, in which.

Figure 1:
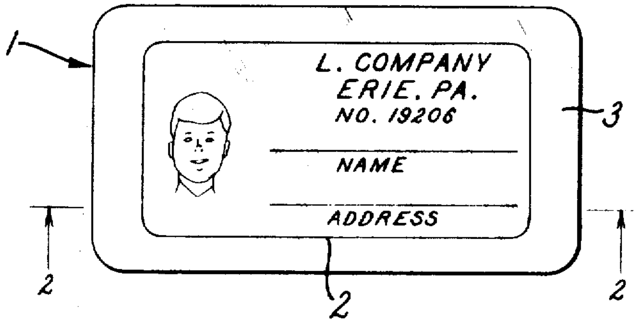
FIG. 1 is a plan view of a security device in the form of an identification card utilizing the teachings of this invention.

It is well known to enclose information bearing surfaces between sheets of clear plastic for purposes of protecting the surfaces and providing some measure of security. However, it is also well known that the laminated sheets of plastic can be cut or melted or the adhesive used to laminate dissolved so that the information-bearing surface can be removed or altered. It is then only a relatively simple matter to reseal or refuse the plastic so that it is virtually impossible to detect the unauthorized entry.

To provide some additional degree of protection, it is possible to photograph the information which it is necessary to protect from alteration and enclose the photographic reproduction with laminated plastic sheets. However, this step alone does not insure unwanted or unauthorized alterations of the information-bearing surface.

Further security measures have been suggested from time to time for purposes of safeguarding information-bearing surfaces in recognition of the fact that laminating per se does not provide the desired protection. U.S. Patent 2,588,067 to Ned Whitehead on Mar. 4, 1952, directed to identification card security, describes a technique of encasing the information-bearing surface in plastic having colored threads so that any attempt to alter the information-bearing surface results in alteration or destruction of the threads. U.S. Patent 3,313,052 to R. L. Malster dated Apr. 11, 1967, relating to the protection of information-bearing surfaces generally and to providing security to identification cards particularly, provides a further teaching of a method for making a tamperproof laminate. In this patent, the patentee teaches that polarized plastic laminates should be used, thereby insuring that any cutting and subsequent resealing is readily revealed by the fact that there is a discontinuity of light when viewed through a suitable analyzing device due to the change in polarizing properties of the polarized material.

Neither of the above teachings provide complete security to the information-bearing surface. That is, it is possible to tamper with the information-bearing surfaces by known means. As a matter of fact, it is possible to tamper with any information-bearing surface which is made up of a laminar structure, even though the information-bearing surface is bonded to a security material since it is always possible to separate or cut into the laminate, make the unauthorized alteration to the information-bearing surface preferably from in back, and then relaminate by resealing or refusing the separated portions into a unitary package. This method of ingress is particularly easy when the information-bearing surface is made up of more than one layer or strata.

A further obvious problem with most special information-protecting devices as those described above is that they are so sophisticated either in the fabrication or in the means necessary for monitoring that the time and money necessary to utilize them dictate that they be used for only very limited applications where a very small number of information-bearing surfaces is involved.

This invention seeks to overcome the problems of vulnerability to tampering by starting with the following premise: If the information-bearing surface itself it defaced, disfigured or deformed in the process of attempted tampering to such an extent that it cannot be restored or reused without the attempted or actual ampering becoming readily apparent to even the most casual observer, then there is nothing left to be altered. Accepting this premise, it becomes necessary to select a material for the information-bearing surface which will have this characteristic when treated in a certain manner.

The applicant has discovered that it is possible to photograph the information to be protected, develop the photograph into a film transparency which becomes the information-bearing surface, and laminate the transparency by a heat-and-pressure process with the result that any attempt to separate or cut the laminated pack results in the immediate defacement or the like of the information-bearing surface. It has been discovered that this defacement spreads far beyond the initial point of entry and spreads rapidly throughout the entire transparency. The fact that the transparency containing the information to be protected is defaced, blistered or disfigured insures that the transparency cannot be used again. Any use thereof would be immediately apparent.

More specifically, the applicant has discovered that it is possible by using positive film transparencies, preferably but not necessarily of a single layer or strata, as the information-bearing surface and laminating the film transparency within sheets of thermoplastic material at predetermined temperature and pressure to provide protected information-bearing surfaces which are completely free from unwanted or unauthorized tampering or changing of the information contained therein. This is primarily achieved by virtue of the fact that the film material itself being of a material dissimilar from that used as the laminating material remains entrapped in the laminate in an embrittled and amorphic state after the laminating process.

Typically clear thermoplastic material such as a copolymer of vinyl acetate and vinyl chloride, vinyl acetate or cellulose acetate is placed on each side of a positive film transparency having little or no thermoplastic characteristics. The thermoplastic materials extend past the transparency on all four sides. This entire assembly is then subjected to heat and pressure to laminate it into one laminar unit. The film transparency is now embrittled to the point where any attempt to open the laminate by heat or by chemical will cause the transparency to blister and crumble.

It should be recognized that the thermoplastic materials identified above are for illustrative purposes and that any plastic material which will fuse into a laminar structure upon the application of heat and pressure is a candidate for use in this invention. It is only necessary that there be no fusion of the laminating materials with the photographic transparency and that the structure of the photographic transparency become brittle and amorphic upon the application of heat and pressure.

Figure 2:
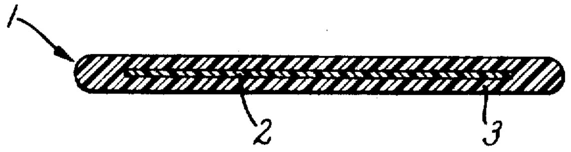
FIG. 2 is a cross-sectional view of the above identification card showing the structure to be found in a security device.
Figure 3:
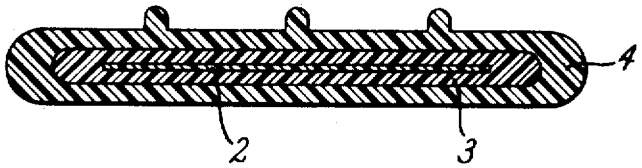
FIG. 3 shows typical cross-section when embossed cover is laminated to the security device.

Turning to the drawings, FIG. 1 shows the typical identification card arrangement 1 with the transparency 2 laminated within the thermoplastic sheets 3. FIG. 2 is a sectional view of FIG. 1 and FIG. 3 illustrates the security device structure when an additional laminar layer is included for embossing purposes.

The following example is provided of a means of utilizing this invention in a manner that makes the discovery extremely useful.

The applicant has ascertained that it is possible to utilize film transparencies developed from a diffusion-transfer color photograph as the transparencies in the security device. The diffusion-transfer color photograph is made as follows:

A sheet of photosensitive material is exposed to create therein a latent image. The latent image is developed and, concurrent with and under the control of this development, an imagewise distribution of color-providing materials is formed. At least a portion of these color-providing materials is transferred by means of an alkaline aqueous processing liquid to a superimposed image-receiving layer to form a colored positive image thereon. Examples of such processes are found in U.S. Pat. 2,983,-606 issued May 9, 1961 to Howard G. Rogers, U.S. Pat. 2,647,049 issued July 28, 1953 to Edwin H. Land, and U.S. Pat. 2,774,668 issued Dec. 18, 1956 to Howard G. Rogers. The image-receiving elements from which the transparency used in the security device is obtained generally comprise an opaque or transparent support coated with an image-receiving layer of a dyeable material which is permeable to the alkaline aqueous processing solution. The dyeable material generally comprises a film-forming material such as polyvinyl alcohol and polyvinyl-pyridine polymers. The image-receiving layer may also include other materials useful in diffusion-transfer processes, such as dye mordants, anti-foggants, oxidizing agents and acids and alkalis for pH adjustment. Typically, there may also be imposed between the image-receiving layer and the support layer of the image-receiving element a water-impermeable subcoat over which the stratum of permeable and dyeable material is applied. Image-receiving elements of the foregoing type are described in U.S. Pat. 3,148,061 issued Sept. 8, 1964 to Howard C. Haas and the aforementioned U.S. Pat. 2,983,606 to Howard G. Rogers.

A typical commercial embodiment of the diffusion-transfer processes described above is a color photograph prepared from Polaroid Polacolor Land Film Type 108. The applicant has discovered, as noted above, that it is possible to remove the image-receiving layer from the image-receiving element by a process of soaking and heat so that the image-receiving layer forms a transparency which can be bonded between the clear thermoplastic sheets as described above. This process is fully described in applicant's co-pending application filed herewith.

A typical example of the steps taken in the process for removing the image layer from the image-receiving element of a diffusion-transfer color photograph made from Polaroid Polacolor Land Film Type 108 is as follows:

The newly developed diffusion-transfer photograph is allowed to dry and then is immersed in water, preferably distilled water, for approximately one second. The photograph is then subjected to heat in the 200° F. range for approximately five to six minutes. After exposure to heat, the borders typically found in a color photograph produced from Polaroid Polacolor Land Film Type 108 are cut away, leaving a color photograph comprising the image-receiving layer and the support layer.

The image-receiving layer is then stripped from the support layer and the image-receiving layer then constitutes the transparency which is now ready for lamination. The above-described transparency is now placed between two sheets of clear thermoplastic which extend beyond the transparency approximately one-quarter of an inch. The thermoplastic sheets are then laminated by a heat-and-pressure process into a laminated structure which constitutes the security device which is the subject matter of this invention. The lamination pressure preferably should be approximately 4000 p.s.i. and laminating temperature preferably should be approximately 300° F.

Of course, it should be recognized that variations in immersion time and variations in time for exposure to heat may be utilized without materially affecting the process for removal of the image-receiving layer transparency from the diffusion-transfer color photograph. For instance, it has been established that a diffusion-transfer color photograph which was developed at some time in the past will require a longer period of immersion. Typically, the aged diffusion-transfer color photograph will require immersion in the water for approximately thirty seconds. In addition, it is possible to speed up the immersion process by using common photographic wetting agents in the immersion liquid or increasing the temperature of the liquid. However, 70° F. is the most commonly used temperature for the immersion liquid. Finally, it is possible to vary the exposure temperatures and the time of exposure without affecting the separation of the image-receiving layer from the support layer. Also, it has been found that heat without immersion will enable the removal of the image-receiving layer from the support layer. However, this procedure has not been found to be as efficient as the practice of immersion before heating.

The above process for making the security device utilizing a transparency from a diffusion-transfer color photograph has been selected as an example because it illustrates a commercial embodiment of this invention which has wide application to identification cards and, more particularly, to identification cards which must be made quickly and with a considerable degree of certainty. The identification cards, particularly credit cards, can be used with a simple device which exposes the transparent card to photosensitive paper, thereby providing a photograph of the person using the card for record purposes.

It should also be recognized that it is possible to add an additional layer or lamination of semirigid or rigid vinyl for purposes of having embossed or raised bits of data thereon. If the embossing is to be added after the lamination of the vinyl sheeting to the laminated transparency, then care must be exercised to ensure that the embossing tool does not puncture the thermoplastic sheeting which is in immediate contact with the photographic transparency.

It should again be emphasized that the teaching of using a transparency obtained from a diffusion-transfer color photograph such as that obtained from Polaroid Polacolor Land Film Type 108 is given for illustrative purposes only. The security device of this invention encompasses the utilization of all heat-and-pressure laminating materials which can be utilized with photographic transparencies having the characteristic of becoming embrittled and amorphic when subjected to heat and pressure so that any attempt to separate or alter the laminated structure results in the immediate defacement or destruction of the information-bearing surface.

Therefore, the matter contained in this description shall be interpreted as illustrative and not in a limiting sense, and the invention shall be considered in the light of the full scope of the following claims.

What is claimed is:

1. A laminar information-bearing card in which an attempt to gain access to an information-bearing layer results in defacement of the layer beyond the point of access, said card comprising: a brittle, amorphic photographic transparency containing identifying data to be protected, and two sheets of thermoplastic material dissimilar in chemical composition to the photographic transparency and surrounding said photographic transparency, each of said sheets being in abutting but unbonded contact with one face of said transparency, said sheets extending beyond the borders of the transparency and joined together at the portions extending beyond the borders of the photographic transparency, the photographic transparency being in a brittle amorphic state as a result of heat and pressure applied to join together the parts of the thermoplastic sheets extending beyond the borders of the photographic transparency.

2. An information-bearing card as set forth in claim 1 in which the photographic transparency is an image-receiving layer stripped from the backing layer of a diffusion-transfer color photograph.

3. A method of producing an information-bearing card in which an attempt to gain access to an information-bearing layer defaces the layer beyond the point where access is gained, comprising the steps of: placing a photographic transparency displaying the information to be protected and formed of a material that is brittle and amorphous after exposure to heat and pressure between two sheets of thermoplastic material that extend beyond all the side edges of the transparency, the sheets of thermoplastic material selected to be of a different chemical composition than the transparency to insure that the transparency is not subsequently fused to the thermoplastic sheets; and fusing together the edge portions of the thermoplastic sheets that extend beyond the side edges of the transparency and simultaneously embrittling and rendering amorphous the transparency by the application of heat and pressure to the thermoplastic sheets.

4. A method of producing an information-bearing card as set forth in claim 3 including the step of stripping the backing layer from a diffusion-transfer color photograph to obtain a transparency which is then placed between the two sheets of thermoplastic material.

References Cited

UNITED STATES PATENTS

| | | | |
|---|---|---|---|
| 1,071,226 | 8/1913 | Goodsell et al. | 40—135UX |
| 2,545,804 | 3/1951 | Butler | 40—2.2 |
| 2,780,015 | 2/1957 | Whitehead | 40—2.2 |
| 3,015,267 | 1/1962 | Dashew | 283—8X |
| 3,279,826 | 10/1966 | Rudershausen | 283—7X |

ROBERT W. MICHELL, Primary Examiner

W. J. CONTRERAS, Assistant Examiner

U.S. Cl. X.R.

283—7; 156—309